United States Patent [19]

Barr

[11] 4,161,731
[45] Jul. 17, 1979

[54] THICKNESS MEASUREMENT SYSTEM

[75] Inventor: Thomas A. Barr, Huntsville, Ala.

[73] Assignee: The United States of America as represented by the Administrator of the National Aeronautics and Space Administration, Washington, D.C.

[21] Appl. No.: 847,277

[22] Filed: Oct. 31, 1977

[51] Int. Cl.² .............................................. G01S 9/24
[52] U.S. Cl. .................................. 343/14; 343/5 NA
[58] Field of Search ............................. 343/14, 5 NA

[56] References Cited
U.S. PATENT DOCUMENTS 3,068,471  12/1962  Erst ........................................ 343/14

Primary Examiner—T. H. Tubbesing
Attorney, Agent, or Firm—George J. Porter; John R. Manning; L. D. Wofford, Jr.

[57] ABSTRACT

An FM radar for the measurement of coal thickness wherein an FM transmitter is modulated by the combination of two signals, one, for example, being of a frequency of 100 Hz, and the other being of a frequency of 15 Hz. A horn-type antenna is used which is filled with a material having a dielectric constant approximating that of coal, the antenna being positioned flush against the coal.

4 Claims, 3 Drawing Figures

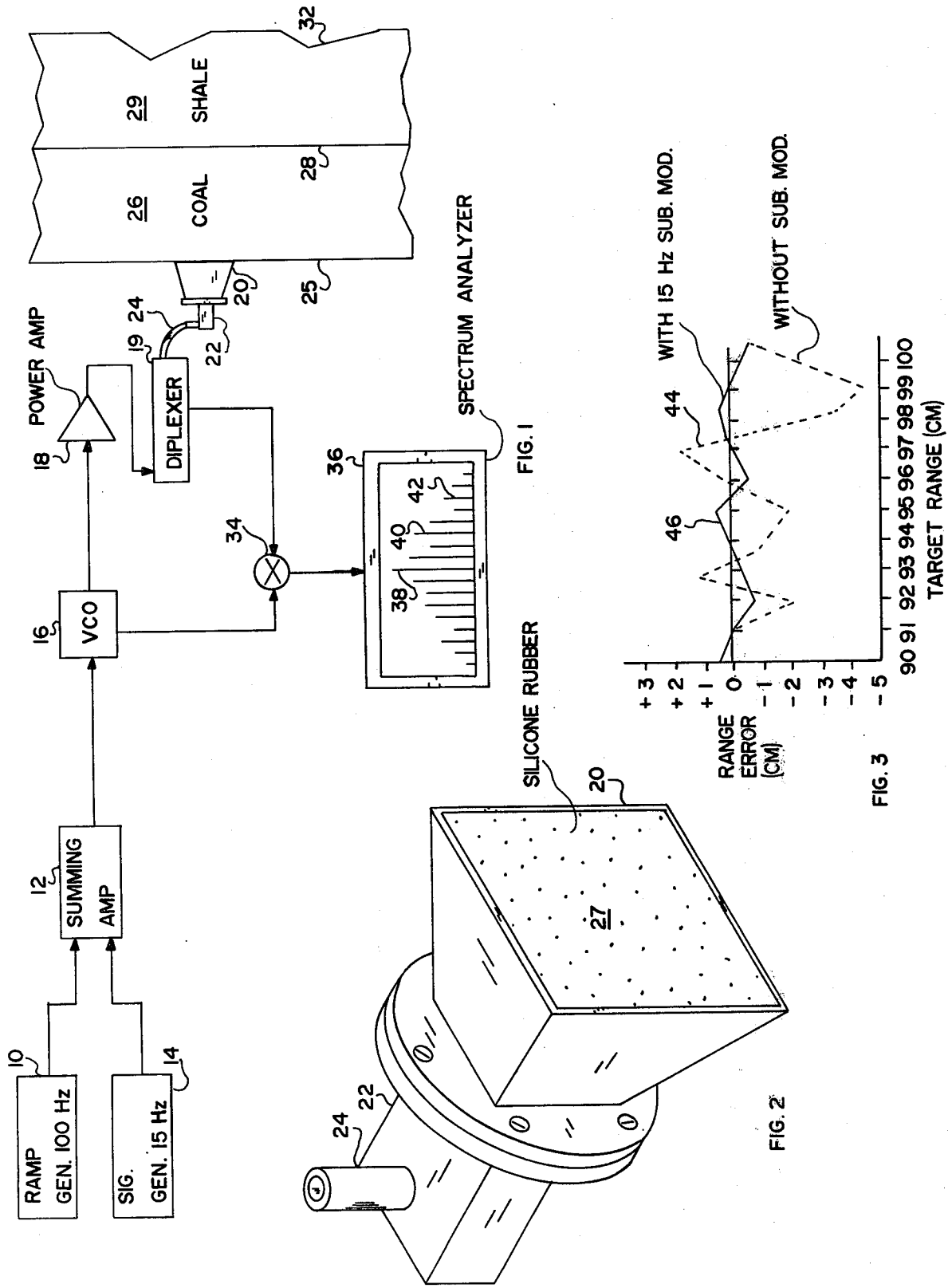

THICKNESS MEASUREMENT SYSTEM

ORIGIN OF THE INVENTION

The invention described herein was made by an employee of the United States Government, and may be manufactured and used by or for the Government of the United States for governmental purposes without the payment of any royalties thereon or therefor.

BACKGROUND OF THE INVENTION

1. Field of the Invention

This invention relates to thickness measurement devices, and particularly to the employment of FM radar for the measurement of coal thickness.

2. General Description of the Prior Art

Frequency modulated radar systems have been employed to measure the thickness of coal, that is, the distance between the face of a seam of coal back to a shale or other backing of the coal. Range is measured as a frequency function, an increase in frequency of the detected signal indicating an increase in thickness. Readout of thickness is commonly accomplished by observing amplitude peaks of the signal on a spectrum analyzer. Peak maximums are denoted on the display as a series of line spectrum components spaced at the modulating rate of the radar, typically 100 Hz. The distance from the radar antenna to a target, or interface of the coal with another medium, is apparent by a series of spectral lines increasing in amplitude and reaching a peak at a frequency corresponding to the distance to the interface. In the case of coal thickness, two or more peaks will be observed corresponding to each of the front and back surfaces of the coal.

This invention deals with two of the problems of radar systems used for this type of measurement. One involves spectrum splitting which occurs when the round-trip distance between the radar antenna and target, coal interface, is an odd multiple of equivalent line spectrum spacings. For example, an FM-CW radar operating over a frequency range of 1.7 to 4.3 GHz with triangular modulation will have a range sensitivity of approximately 35 Hz per cm. In such case, if the radar video spectrum is examined, a line every 100 Hz will be found with a maximum amplitude corresponding to a target (coal interface) range. As an example, a target at a 30 centimeter range might produce a peak in energy at 4 KHz. However, if the target to radar distance is changed by a small amount (approximately 1.2 cm), the maximum energy peak that was present before this small change in distance now becomes a minimum. This spectrum splitting produces two apparent targets and reduces operator ability to determine target range to an accuracy better than 100 Hz, 2.6 cm or 1.1 inch. A further problem in measuring thickness by radar, particularly with FM-CW type systems, is the extremely large echo from the front coal surface, which echo overlaps or masks the very weak echo from the distant target (coal-shale interface). In fact, when the thickness of the coal is greater than a few inches, it becomes difficult to identify the true location of the coal-shale interface.

It is the object of this invention to overcome the aforesaid and other difficulties.

SUMMARY OF THE INVENTION

In accordance with the basic feature of this invention, the frequency modulation of an FM-CW radar system employed in the measurement of the thickness of material would be produced by a signal which is a combination of a normal frequency ramp or triangular wave signal and a lower frequency signal which, in effect, modulates the triangular wave signal. As a second feature of this invention, the antenna would be of the horn type and filled with a dielectric material having a dielectric constant substantially the same as the dielectric constant of the coal or other material, the thickness of which is to be measured.

BRIEF DESCRIPTION OF THE DRAWINGS

FIG. 1 is an electrical schematic diagram of an embodiment of the invention.

FIG. 2 is a pictorial view of an antenna as contemplated by this invention.

FIG. 3 is a graph illustrating an improvement achieved by the present invention.

DETAILED DESCRIPTION OF THE DRAWINGS

Ramp generator 10 generates a ramp or triangular signal waveform of a frequency of 70 to 200 Hz, typically at 100 Hz, and provides this signal waveform to summing amplifier 12. Signal generator 14 generates a sine or other shaped waveform at a frequency lower than the frequency output of ramp generator 10, typically in the range of 3 to 30 Hz, and as an example, at 15 Hz. This low frequency signal is applied as a second input to summing amplifier 12, and as a result, the latter provides a signal output which consists of the 100 Hz ramp waveform signal combined with the 15 Hz submodulation signal. This output is applied to a modulation input of voltage control oscillator (VCO) 16 operating as a conventional frequency modulated radio frequency oscillator. This oscillator provides as an output an FM signal between 1.7 and 4.3 GHz which is applied to power amplifier 18. Power amplifier 18 amplifies the signal and applies it to diplexer 19, which then feeds this signal to antenna 20.

As shown in FIGS. 1 and 2, antenna 20 is a horn-type antenna which is fed from a small section of wave guide 22, in turn fed by co-axial cable input connection 24 from diplexer 19. As shown in FIG. 1, antenna 20 is positioned against the coal face 25 of coal 26, the thickness of which, face 25 to shale interface 28 of shale 29, is to be measured. As a particular feature of this invention, antenna 20 and wave guide 22 (FIG. 2) are filled with a dielectric material 27, such as silicone rubber, which has a dielectric constant of approximately 4.5, which is substantially the same as the dielectric constant for coal.

Referring again to FIG. 1, it is to be noted that the transmitted signal commences its passage in the dielectric material back in wave guide 22, and thus the transition to face 25 of coal 26, which is a transition between like dielectric materials, results in a smaller reflection of energy, or echo, than would normally be the case (with a conventional antenna with a substantial air dielectric region) between the antenna and coal face.

The echo signals from face 25, coal shale interface 28, and shale rear surface 32 are received by antenna 20 and fed to diplexer 19 which feeds these signals to product detector 34. Product detector 34 multiplies, or mixes, a sample of the transmitted signal from VCO 16 with a reflected signal and provides the echo signals as difference frequencies to spectrum analyzer 36. As shown, echo frequency 38 is representative of coal face 25, echo frequency 40 is representative of coal-shale interface 28, and echo frequency 42 is representative of rear face 32 of shale 29. The horizontal scale of spectrum analyzer 36 is calibrated in distance, typically in centimeters, and the distance between echo frequencies is indicative of the spacing between faces of the coal and shale.

FIG. 3 illustrates by dashed line 44 a plot of range error in centimeters versus target range in centimeters for a conventional FM-CW radar measurement system without the submodulation feature of this invention, and illustrates by solid line 46 a plot of range error for a system with the submodulation feature. From these lines, it will be noted that the submodulation feature provides a substantial improvement.

As suggested above, the employment of dielectric filled horn antenna 20 significantly decreases the magnitude of the front surface echo. This is important since the front surface echo is the stronger echo, and it tends to mask out the presence or exact position of an echo or echoes from the back side of the coal or from other interior boundaries. Thus, by reducing the magnitude of the front echo, it becomes easier to detect the precise frequency position of an interior boundary, and, in fact, it has been found that signal recognition is improved by approximately 10 db. This in turn enables the signal processing circuitry to be less elaborate, and it may be decreased in size and cost.

Having thus disclosed my invention, what is claimed is:

1. A frequency modulated CW radar thickness measurement system comprising:
   a frequency modulatable oscillator;
   first signal generating means for generating a generally triangular-shaped electrical waveform signal of a frequency of 70 to 200 Hz;
   second signal generating means for generating an electrical signal of a frequency of 3 to 30 Hz;
   signal combining means responsive to said first and second signal generating means for providing a modulating signal to said modulatable oscillator which corresponds to the output of said first generating means modulated by the output of said second generating means;
   a horn-type antenna having a solid interior of non-conductive material;
   transmitting means responsive to said modulatable oscillator for coupling a replica of the output of said modulatable oscillator to said antenna means, whereby a signal is transmitted from said antenna;
   receiving means coupled to said antenna and said frequency modulatable oscillator for providing a difference signal; and
   frequency indicating means responsive to the output of said receiving means for indicating difference frequencies, which frequencies are representative of range of a reflection from said antenna, whereby the difference in distance between reflections is representative of opposite surfaces, and thus indicative of the distance between said surfaces and thereby the thickness of said body.

2. A system as set forth in claim 1 wherein the frequency of said first signal generating means is approximately 100 Hz, and the frequency of said second generating means is approximately 15 Hz.

3. A system as set forth in claim 1 wherein said material has a dielectric constant of 4.5.

4. A system as set forth in claim 3 wherein the dielectric material in said antenna is silicone rubber.

* * * * *